United States Patent [19]

Larson et al.

[11] 4,172,396
[45] Oct. 30, 1979

[54] CENTER POINT STEERING TOOL

[76] Inventors: Dale R. Larson, 113 S. Woodcrest Dr., Fargo, N. Dak. 58102; Raymond L. Anderson, 637 Cedar La., Moorhead, Minn. 56560

[21] Appl. No.: 824,925
[22] Filed: Aug. 15, 1977
[51] Int. Cl.² .............................................. B67B 7/24
[52] U.S. Cl. ...................................................... 81/3 R
[58] Field of Search ...................... 81/3 R; 269/45, 75

[56] References Cited

U.S. PATENT DOCUMENTS

| | | | |
|---|---|---|---|
| 1,306,858 | 6/1919 | Salter | 269/45 |
| 1,446,811 | 2/1923 | Rowland | 269/75 X |
| 2,836,139 | 5/1958 | Holmberg | 269/75 X |

Primary Examiner—James G. Smith
Attorney, Agent, or Firm—Williamson, Bains, Moore & Hansen

[57] ABSTRACT

A tool for releasably locking the steering linkage of a vehicle against movement includes a pair of clamps interconnected together by a link. One clamp is applied to the steering linkage of the vehicle and the other clamp is applied to the frame or any other component of the vehicle to anchor the steering linkage against movement during alignment and inspection of the front wheels of the vehicle.

5 Claims, 3 Drawing Figures

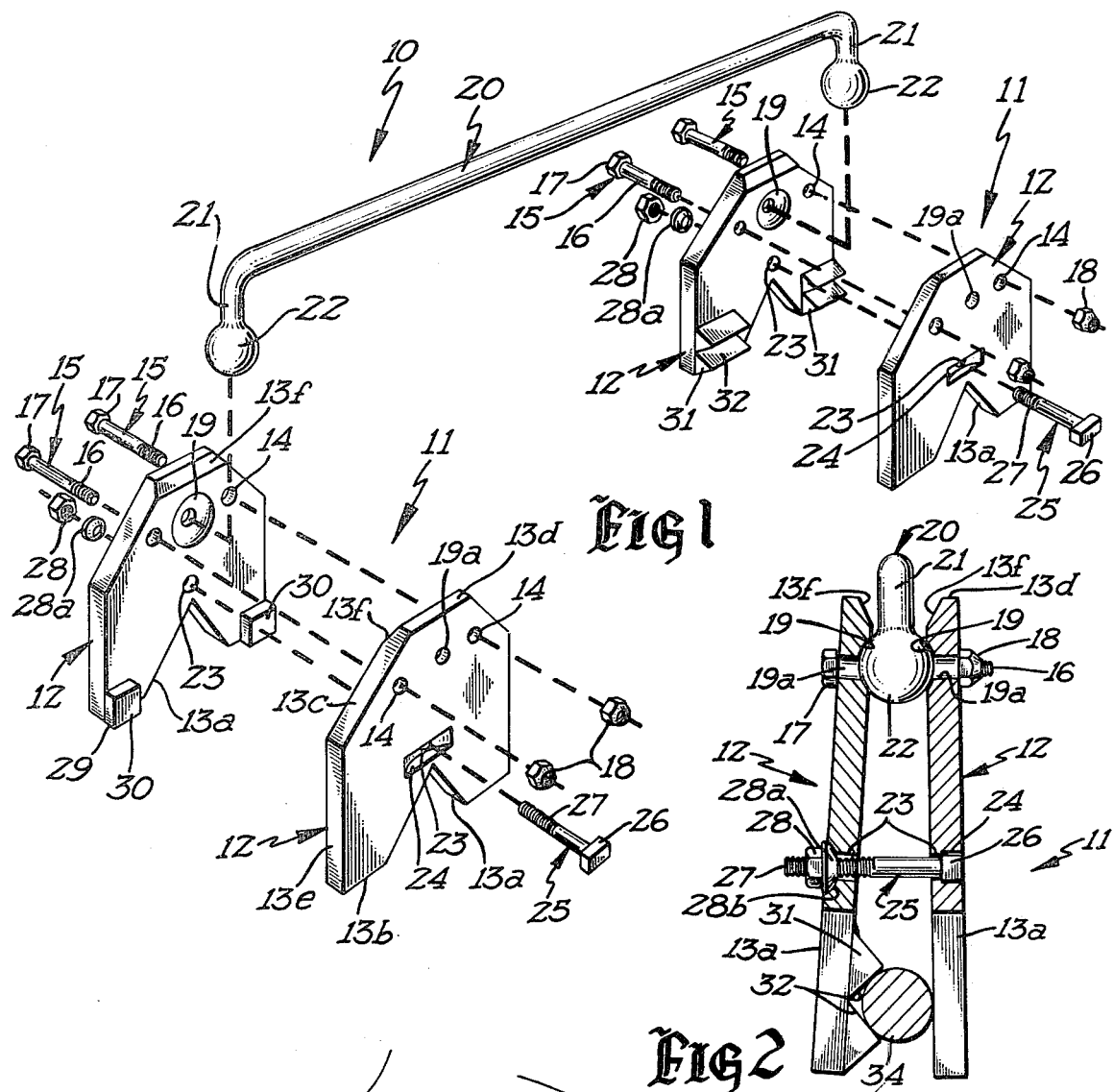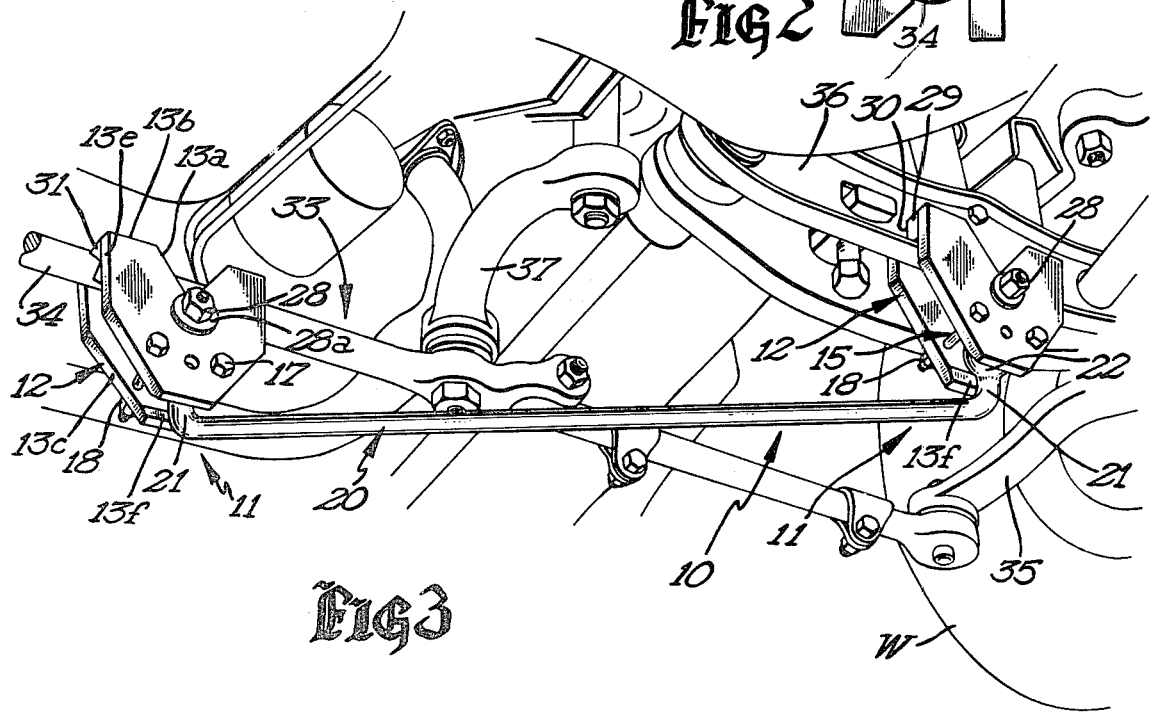

CENTER POINT STEERING TOOL

SUMMARY OF THE INVENTION

This invention relates to an automotive tool and more particularly to a tool for releasably locking the steering linkage of a vehicle against movement during alignment of the front wheels.

During alignment and toe-in adjustment of the front wheels of passenger cars and light trucks, mechanics sometimes do not center the steering wheel after adjustment of the front wheels. Although the steering wheel of the vehicle is not required to be centered for operation of the vehicle, the steering wheel which is not centered sometimes causes confusion of the vehicle operator with respect to steering during operation of the vehicle.

In certain automobiles and light trucks, the steering equipment is locked when the engine is not operating, and the engine, in these vehicles, must be operated during inspection and alignment of the front wheels of the vehicle. It will be seen that this alignment and front wheel inspection procedure creates a hazardous condition for alignment mechanics.

It is therefore a general object of this invention to provide a novel tool, of simple and inexpensive construction, which releasably locks the steering linkage of the vehicle against movement thereby permitting the front wheels of the vehicle to be adjusted while maintaining the steering wheel in a centered position.

It is also an object of this invention to provide a tool which releasably locks the steering linkage and thereby obviates the need of operating the engine of the vehicle during front wheel alignment and adjustment even though the vehicle is of the type in which the steering system is locked when the engine is shut off.

These and other objects of this invention will more fully appear from the following description made in connection with the accompanying drawings wherein like reference characters refer to the same or similar parts throughout the several views, and in which:

FIGURES OF THE DRAWINGS

FIG. 1 is an exploded perspective view of the novel tool,

FIG. 2 is a cross-sectional view of one end portion of the tool illustrating the manner in which it is applied to the steering linkage of a vehicle, and FIG. 3 is a perspective view illustrating the manner in which the tool is used to releasably lock the steering linkage of a vehicle against movement.

DESCRIPTION OF THE PREFERRED EMBODIMENT OF THE INVENTION

Referring now to the drawings, and more specifically to FIG. 1, it will be seen that one embodiment of my novel steering linkage tool, designated generally by the reference numeral 10, is thereshown. The steering linkage tool 10 is comprised of a pair of clamps 11, each clamp including a pair of clamping members or plates 12. The clamping members 12 are formed of a rigid metallic material, such as steel or the like. Each clamping member 12 is of flat, generally rectangular configuration, and each has a V-shaped recess 13a in the lower edge 13b thereof. Each clamping member 12 also includes angulated or inclined edges 13c extending between the upper edge 13d and the side edges 13e thereof. Referring now to FIGS. 1 and 2, it will be seen that the inner surface of each clamping member 12 adjacent the upper edge is beveled as at 13f.

Each clamping member 12 is also provided with a pair of laterally spaced apart openings 14 therethrough, the openings 14 being located adjacent the inclined edges 13e thereof. Suitable bolts 15 extend through registering openings 14, the bolts 15 including a head 17 and a threaded shank 16 and each is provided with a nut 18. The nut and bolt assembly releasably secure a pair of clamping members together.

Referring again to FIGS. 1 and 2, it will be seen that the inner surface of each clamping member 12 is provided with a generally hemispherical shaped recess 19 therein which is located between the openings of 14. The clamps 11 are secured to an elongate link or rod 20 which is of substantially straight configuration and which has depending end portions 21 which terminate in ball elements 22. Each ball element 22 is positioned in the recesses 19 of a pair of clamping members 12 to thereby define a universal type pivot connection between the link and the clamps. The beveled edge surfaces 13f permit clearance between the plates and rod 20. With this arrangement, a wide range of pivotal adjustment is possible between each clamp and the link 20.

Means are also provided for releasably securing each clamp 11 to a vehicle component. To this end, each clamping member 12 is provided with an opening 23 therethrough, the opening 23 being located adjacent but spaced above the V-shaped recess 13a. It will also be noted that the outer surface of each clamping member 12 has a generally elongate shaped recess 24 therein which registers with the associated opening 23. An elongate bolt 24 having an enlarged head 26 and a threaded shank 27 extends through registering openings 23 of the pair of clamping members 12 and is secured thereto by a spherical washer 28a and a nut 28. When the bolt 25 projects through the associated pair of clamping members 12, the head 26 will be positioned within the recess 24 and will be prevented from turning by engagement with the edges defined by this recess.

One of the clamping members 12 is provided with a pair of laterally spaced apart generally rectangular shaped gripping elements 29 which are secured to the inner surface thereof and which project laterally therefrom. Each of these gripping elements 29 presents a substantial flat gripping surface 30 as best seen in FIG. 1. Referring again to FIG. 1, it will also be seen that another of the clamping members 12 is provided with a plurality of spaced apart V-shaped gripping elements 31 secured to the inner surface thereof and projecting laterally therefrom. The V-shaped gripping elements 31 are arranged in pairs adjacent the lower edge of the associated clamping members and each presents a gripping edge 32. It will also be noted that an adjacent pair of the V-shaped elements 31 defines a concave recess therebetween to receive an arcuate surface therebetween, such as the steering linkage as best shown in FIG. 2.

The steering linkage tool 10 is adaptably applied to the steering linkage of the vehicle and to some other component of the vehicle for the purpose of locking the steering linkage against movement during inspection and/or alignment of the front wheels. Referring now to FIG. 3, it will be seen that one of the clamps 11 has been applied to the pitman arm 34 of the steering linkage 33. In this respect, the clamp 11 having the clamping member 12 with the V-shaped clamping element, is applied to the pitman arm 34 so that the pitman arm is received within the recess defined by adjacent pairs of adjacent gripping elements. The other associated clamping member has a planar inner face which engages the pitman arm. It will be noted that the pitman arm 34 has been illustrated as connected to a conventional idler arm 35 of an associated front wheel W. The other clamp 11 is clamped to the lower control arm 36 of the vehicle, the lower control arm being pivotally connected to the pitman arm 34 by link 37.

When the steerage linkage tool 10 is applied to the steering linkage in this manner, the linkage is locked against movement and the mechanic may then adjust the front wheel for alignment or toe-in using conventional alignment machines and techniques. It is pointed out that the steering wheel for an automobile or light truck will be centered before the steering wheel will be maintained in a centered position at all times that the front wheels are being adjusted.

Similarly, in those automobiles and trucks having a steering system which is locked when the engine is turned off, the engine may be started to center the steering wheel and the linkage tool may then be applied to the steering linkage to lock the steering wheel in a centered position. Thereafter, the engine may be turned off and the mechanic may then adjust the front wheels. The use of gripping edges on one of the clamping members permits this member to be applied to arcuate surfaces as well as flat surfaces. The clamping member provided with the gripping elements 29 is specifically adapted for firm engagement with flat or planar surfaces.

By utilizing a ball-type connection between the clamps, the clamping tool has a wide range of pivotal adjustments and permits one of the clamps to be applied to almost any element of the frame of the vehicle very easily by the mechanic. In use, the bolt and nut assembly 27 will be loosened prior to application of the tool to the vehicle component while the clamps will be retained in pivotally connected relation with the link 20. It has been found that the time required to apply the tool to the steering linkage and to other components of the vehicle is approximately thirty seconds. Thus, alignment mechanics may very easily and quickly apply the tool to the vehicles at a minimum of time and with a minimum of effort while being assured that the steering wheel will be maintained in a centered position. This tool also obviates the need of running the engine of a steering wheel lock out type vehicle since the steering wheel will be maintained in a centered position throughout the alignment work.

Thus, it will be seen that I have provided a novel steering linkage tool which may be effectively used by front end alignment mechanics to assure centering of the steering wheel during front end alignment and inspection work.

Thus, it will be seen that I have provided a novel steering linkage tool, which is not only of simple and inexpensive construction, but one which functions in a more efficient manner than any heretofore known comparable tool.

We claim:

1. A tool for locking the steering linkage against movement during the inspection and alignment of the front wheels of a vehicle, comprising:

an elongate rod having a pair of ball elements, each being integral with one end of said rod, a pair of clamps each including a pair of substantially flat symmetrical clamping members, each having a plurality of edges, each clamping member having a socket defining recess therein, located adjacent one of said edges, the recesses in the clamping members for each clamp being disposed in confronting relation and accommodating one of said ball elements therein, means connecting the clamping members of each pair of clamps to the associated ball element of the rod to thereby permit universal pivoting movement between the rod and said pairs of clamps, the clamping members of each pair of clamps being pivotal relative to each other about the associated ball element to permit said clamping members of each clamp to be disposed in non-parallel relation with respect to each other when in clamping relation, and means on the pairs of clamping members of each clamp permitting one of said clamps to be releasably clamped to the steering linkage of a vehicle and the other clamp to be releasably clamped to another component of the vehicle to releasably lock the steering linkage against movement.

2. The tool as defined in claim 1 wherein said rod has angularly offset opposite end portions, each of said ball elements being integral with one of said angularly offset end portions of the rod.

3. The tool as defined in claim 1 wherein each of said clamping members has a substantially flat inner surface, and one clamping member of each pair has gripping elements secured to the inner surface thereof and projecting therefrom.

4. The tool as defined in claim 3 wherein the gripping elements on one of said clamping members have substantially flat gripping surfaces.

5. The tool as defined in claim 3 wherein the gripping elements on one of said clamping members present gripping edges.

* * * * *